United States Patent [19]

Nobue et al.

[11] Patent Number: 4,503,306
[45] Date of Patent: Mar. 5, 1985

[54] HIGH FREQUENCY HEATING APPLIANCE

[75] Inventors: Tomotaka Nobue; Shigeru Kusunoki, both of Yamatokoriyama, Japan

[73] Assignee: Matsushita Electric Industrial Co., Ltd., Osaka, Japan

[21] Appl. No.: 459,541

[22] PCT Filed: Apr. 22, 1982

[86] PCT No.: PCT/JP82/00135
§ 371 Date: Dec. 22, 1982
§ 102(e) Date: Dec. 22, 1982

[87] PCT Pub. No.: WO82/03743
PCT Pub. Date: Oct. 28, 1982

[30] Foreign Application Priority Data

Apr. 24, 1981 [JP] Japan ................................. 57-62865

[51] Int. Cl.³ .............................................. H05B 6/64
[52] U.S. Cl. ........................ 219/10.55 F; 219/10.55 R
[58] Field of Search ............... 219/10.55 F, 10.55 B, 219/10.55 R

[56] References Cited

U.S. PATENT DOCUMENTS 3,855,440 12/1974 Staats et al. ............... 219/10.55 F
3,953,702 4/1976 Bickel ........................ 219/10.55 R
4,415,789 11/1983 Nobue et al. ............... 219/10.55 B Primary Examiner—Roy N. Envall, Jr.
Assistant Examiner—M. M. Lateef
Attorney, Agent, or Firm—Wenderoth, Lind & Ponack

[57] ABSTRACT

A high-frequency heating appliance includes a high-frequency heating source constituted of a solid state high-frequency generating section with its oscillation frequency in the 915 MHz band, a heating chamber which, in the frequency band, produces the $TE_{201}$ mode providing an electric field uniform in the direction of the height of the heating chamber, and a door constituting one wall of the heating chamber for access to the heating chamber to insert and remove an object of heating. The high-frequency heating source is located substantially in the middle of the upper or lower wall surface of the heating chamber and remote from the upper and lower hinges of the door.

2 Claims, 2 Drawing Figures

HIGH FREQUENCY HEATING APPLIANCE

TECHNICAL FIELD

This invention relates to a high-frequency heating appliance equipped with a solid-state oscillator as a high-frequency generating means, which is designed particularly for improved balance of weight of the appliance in its entirety.

BACKGROUND ART

Most of the conventional high-frequency heating appliances use an electron tube oscillator such as a magnetron in their heat source, which electron tube oscillator requires a high voltage, usually thousands of volts, for its drive power source, imperatively needing massive step-up transformers and high voltage capacitors.

With advances in semiconductor technology, solid-state elements capable of high-output function have made their advent in the microwave region, accelerating infusion of solid-state techniques into television relay stations.

In such a background has come the realization of a solid-state version of the high-frequency heating source which is the nucleus of high-frequency heating appliances, providing a high-frequency heating appliance equipped with a low voltage drive solid-state high-frequency generating section in contrast to the conventional electron tube oscillator, dispensing with the massive step-up transformer and high-voltage capacitor, thereby making it possible to design the appliance so that it is lightweight and compact.

Solid-state elements, as is known in the art, have upper limits in their operating frequencies and also in the power they can handle. These two types of limits may be said to be of an opposing nature in terms of element structure; that is, the output power of a solid-state element is inversely proportional to its operating frequency or the square of its operating frequency. As a result, when it is desired to obtain output power equivalent to that of the conventional high-frequency heating appliance, a plurality of solid-state elements must be used to constitute the solid-state high-frequency generating section.

Further, a high-frequency heating appliance is provided with a door for access to the heating chamber to insert and remove an object of heating. The door, which is a component of the heating chamber, in civil or private high-frequency heating appliances, has applied thereto approaches to convenient usage and aesthetic improvement; thus, generally, the door or heating chamber flange is provided with a microwave energy sealing apparatus using a choke seal mechanism or microwave energy absorber. Besides this, the door is provided with a viewing window for looking into the heating chamber, which viewing window is also provided with a means for preventing microwave energy leakage.

Although the door is considerably heavy, there has been no case of the body of a conventional high frequency heating appliance being tilted upon opening and closing of the door, because of the presence of the heavy step-up transformer and the like in the body. However, when the body is made lighter and lighter in weight by the solid-state version of the high-frequency heating source, the balance of the weight between the door and the body is upset, so that there is a danger of the body being tilted upon opening and closing the door.

The width, depth and height of the heating chamber in the conventional high-frequency heating appliance are considerably large, by reason of practical use, for the predetermined wavelength of high-frequency waves from the high-frequency heating source.

As a result, there is produced in the heating chamber a variety of electromagnetic field modes. Some of these electromagnetic field modes are suitable for uniform heating of an object but the rest are not. In selecting a particular electromagnetic field mode suitable for uniformly heating a particular object, there may be contemplated a method of controlling the oscillation frequency of the high-frequency heating source, but the mechanism to implement such a method is expensive.

Therefore, the conventional appliance has resorted to deliberately disturbing the electric field distribution in the heating chamber as by a stirrer, or to rotating an object of heating, but the mechanism therefor is complicated and, moreover, does not necessarily ensure uniform heating.

In connection with a high-frequency heating appliance comprising a high-frequency heating source capable of variable control of oscillation frequency in a predetermined frequency band, and a heating chamber having such a size as to produce particular electromagnetic field modes, we have previously provided a high-performance appliance wherein the oscillation frequency of the high-frequency heating source is variably controlled to cause the heating chamber to resonate with said particular electromagnetic field modes; but, the mechanism for variably controlling oscillation frequency is expensive.

SUMMARY OF THE INVENTION

This invention provides a high-frequency heating appliance comprising a high-frequency heating source consisting of a solid-state high-frequency generating section, and a heating chamber in which a $TE_{201}$ mode having no vertical standing wave, that is, in the direction of the height, is produced, with said high-frequency heating source being located remote from the pivotal support for the door to maintain the overall balance.

DETAILED DESCRIPTION OF THE PREFERRED EMBODIMENT

Figure 1:
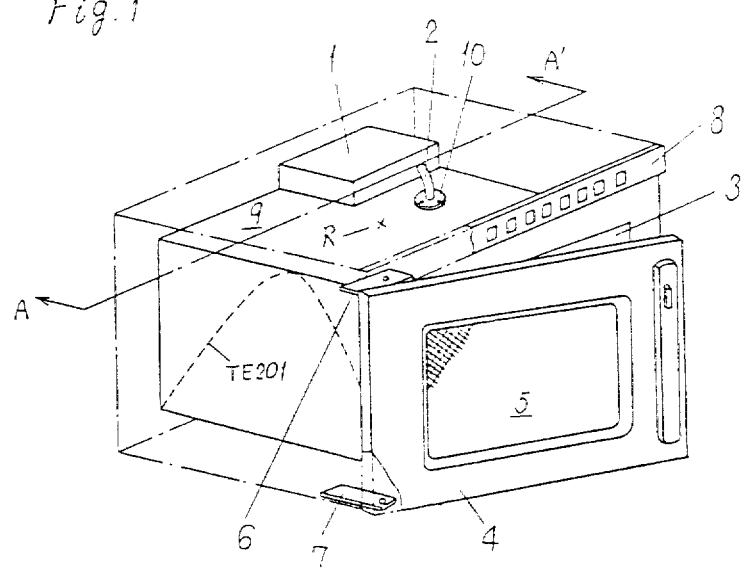
FIG. 1 is a perspective view of a high-frequency heating appliance according to an embodiment of the present invention.

This invention, as a first point, employs the 915 MHz band which is one of the ISM (industry, Science, Medicine) frequency bands as the oscillation frequency for the high-frequency heating source.

While most of the conventional high-frequency heating appliance use the 2,450 MHz band which is one of the ISM frequency bands, the use of the 915 MHz band has merits that a smaller number of elements are required to constitute the heating source because power which can be handled by a single solid-state element is high, and that energy saving can be achieved because the high-frequency conversion efficiency of the elements is high. It is also effective for thawing followed by cooking in that in high-frequency heating, the lower the frequency, the deeper the heating effect extends through an object of heating.

As a second point, the invention selects a heating chamber having a volume such that in the 915 KHz band, the $TE_{201}$ mode having no standing wave in the vertical direction is produced in the heating chamber.

A heating chamber used in high-frequency heating appliances is one referred to as a cavity resonator, as is known in the art of microwave engineering; thus, the dimensions of the heating chamber must be so selected that it resonates. With the 915 MHz band, the demensions of a heating chamber having a practical volume become compatible with the heating chamber exciting wavelength and the electromagnetic field modes produced in the heating chamber are considerably limited.

These limited electromagnetic field modes are mostly low-degree modes, so that attainment of uniform heating is easier than in the case of the 2,450 MHz band, and since the 915 MHz band ensures that an object of heating is high-frequency heating throughout, uniform heating is improved. However, since the electromagnetic field modes produced in the heating chamber are considerably limited, it is necessary to select an effective (capable of causing the heating chamber to resonate) electromagnetic field mode which efficiently supplies high-frequency power to various objects of heating.

In the present invention, the electromagnetic fields produced in the heating chamber are uniformly directed vertically of the heating chamber. This suppresses the variation of the heating chamber resonant frequency with the thickness of an object of heating. Further, the invention imparts a degree of selectivity to the position of the power supply section which supplies high-frequency power to the heating chamber, taking consideration of a point where balance of weight between the door and the body can be established.

Thus, in order to make the body compact and to establish balance of weight between the door and the body, the $TE_{201}$ mode is selected and the high frequency heating source is installed in the vicinity of the excitation position where $TE_{201}$ mode excitation can be effected, remote from the door support with respect to substantially the middle of the upper or lower wall surface of the heating chamber by making use of the space at the upper or lower wall surface of the heating chamber.

As a third point, the heating chamber is constructed in such a dimensional relation that the dimension in the direction having two standing waves is equal to or shorter than the dimension in the direction having a single standing wave, whereby the heating chamber is given a high Q value at no load so as to reduce high-frequency power loss due to other than objects of heating.

A further feature of the present invention is that the absence of standing waves in the vertical direction in the heating chamber facilitates the engineering design of the heating chamber and the dimensioning of the heating chamber, leading to cost reduction.

Further, the electric field distribution in the heating chamber can be grasped and the process of heating an object can be made definite, so that heating performance is improved.

The positioning of the power supply section and the high-frequency generating section close to each other shortens the transmission line connecting the two sections and hence reduces transmission loss and saves transmission line material.

A high-frequency heating source 1 shown in FIG. 1 is constituted of a solid-state high frequency generating section consisting of an oscillator part and an amplifier part using a solid-state element suitable for oscillator makeup and a solid-state element suitable for amplifier makeup, the oscillation frequency used being set in the 915 MHz frequency band which is one of the IMS frequency bands. The output high frequency power from this solid-state high frequency generating section is transmitted to heating chamber 3 through a transmission line 2.

The heating chamber 3 has a volume such that the heating chamber resonant frequency at no load is inside the 915 MHz band or outside the same but close to its upper limit, and that the $TE_{201}$ mode is produced in the heating chamber. The subscripts 2, 0 and 1 indicate the number of standing waves produced in the direction of the width height and depth of the heating chamber, respectively. The front (widthwise extending) opening in the heating chamber 3 is provided with a door 4 which covers said opening and which gives access to the heating chamber to put in and out an object of heating (not shown). The door 4 is equipped with microwave energy sealing apparatus for preventing microwave energy leakage (not shown) when it is fitted to the opening to cover the same, whereby the high-frequency power transmitted to the heating chamber from the high frequency generating section is prevented from leaking outside the appliance. It is also equipped with a viewing window 5. As a result, the door 4 is heavy. The door 4 is pivotally supported by an upper hinge 6 and a lower hinge 7.

Since the use of solid-state elements saves the need of providing a space for installation of the high voltage generating parts, the input-signal inputting section for manually controlling the output from the high-frequency heating source 1 or inputting output control signals is disposed on a thin operating panel 8 located above the door 4, thereby reducing the width of the whole appliance. In addition, the operating panel 8 may be made integral with the door 4.

In the conventional high-frequency heating appliance comprising such components, when the door 4 is opened and closed, the balance of weight between the door 4 and the body is upset, causing the body to tilt forwardly or shift sideways. One of the points of the invention lies in the fact that in order to eliminate such inconvenience in usage, the high-frequency heating source 1, which is a heavy portion of the body, is disposed with due consideration given to the balance of weight between it and the door 4.

As described above, the volume of the heating chamber of the invention is such that the $TE_{201}$ mode is produced with respect to the oscillation frequency of the high-frequency heating source 1. As is known in the art, the electric field distribution in the heating chamber varies with the object of heating which is a load. Since such object of heating is not limited in kind and in size, the forms of electric field distribution produced in the heating chamber are in infinite variety. Thus, the second point of the invention lies in the fact that in order to simplify the forms of electric field distribution, which is three-dimensional, the electric field distribution is made uniform in one direction in the heating chamber so that the forms of electric field distribution may be considered in two dimensions.

Where the heating chamber is excited in such a manner that the electric field distribution is uniform in one direction, the method of excitation and the position of the excitation means are limited.

For efficient transmission of high frequency power from the solid state high frequency generating section to the heating chamber, it is preferable that the output end of the solid-state high-frequency generating section be positioned close to the heating chamber exciting position.

From this point of view and in consideration of the balance of weight for the door, the $TE_{201}$ mode, which gives a degree of selectivity to the exciting position, is chosen as the electric field mode to be produced in the heating chamber. A heating chamber power supply section 10 is disposed in a heating chamber wall surface, remote from the upper and lower hinges 6 and 7 of the door with respect to substantially the middle R of the heating chamber wall surface (in FIG. 1, upper wall surface) 9, while the high-frequency heating source 1 constituted of the solid-state high-frequency generating section is disposed close to said power supply section, thereby balancing the weight between the door and the body during the opening and closing of the door.

Figure 2:
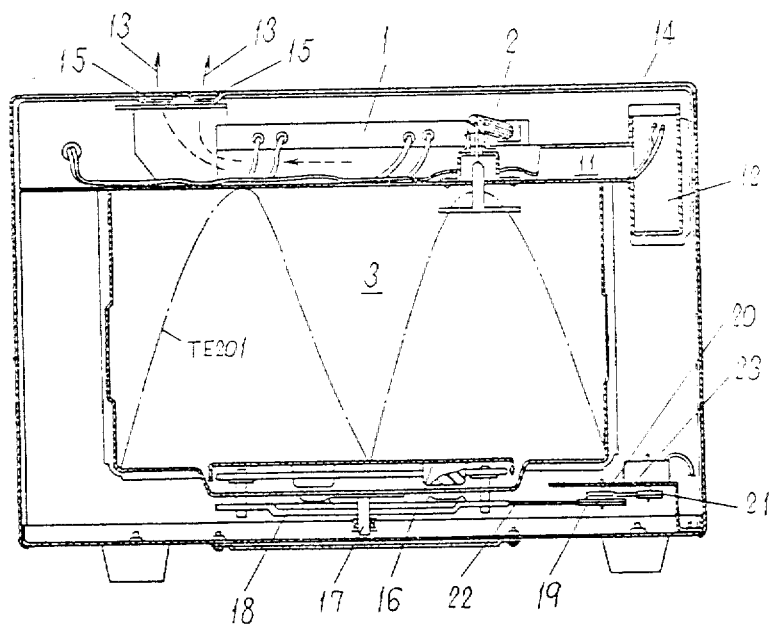
FIG. 2 is a section taken along the line A—A' in FIG. 1.

FIG. 2 is a section of the high-frequency heating appliance, taken along the line A—A' in FIG. 1, showing an embodiment of the invention.

The high-frequency heating source 1 is mounted in intimate contact with a hollow rectangular waveguide 11 for efficient heat dissipation from the solid-state element, with cooling air (indicated by arrows 13) from a fan 12 being introduced into the rectangular waveguide 11, from which it is discharged outside the body through air discharge parts 15 formed in the body 14. Mounted on the lower wall surface of the heating chamber 13 is a turntable 16 on which an object of heating is placed for rotation during heating. The reference numeral 17 denotes a bearing for a pulley 18 which rotates the turntable 16; reference numerals 19, 20 and 21 denote elements of a turntable drive system; and reference numerals 22 and 23 denote power transmission belts.

The drawing illustrating an embodiment of the present invention shows a case where two standing waves are produced in the direction of the width of the heating chamber 3, but two standing waves may be produced in the direction of depth thereof.

Receiving an object of heating, which is a dielectric, in the heating chamber changes the characteristic of the heating chamber. Even if the heating chamber is designed so that at no load it resonates with the $TE_{201}$ mode in a certain frequency, the presence of an object of heating changes the frequency at which it resonate with the $TE_{201}$ mode. One method of reducing the rate of change of this resonant frequency is to enable the electric field distribution in the heating chamber to be considered two-dimensionally; that is, to select an electromagnetic field mode which has no standing wave in one direction in the construction of the heating chamber. This one direction may theoretically be any direction. However, if the direction of the depth of the heating chamber is selected in consideration of convenience in usage, the power supply section must be located on the innermost wall surface of the heating chamber. This arrangement would have the drawback of the dimension in the direction of the depth of the heating chamber being increased. If the direction of the width is selected, an object of heating is received adjacent to the wall surface which is parallel with the electric field distribution and in which the field strength is relatively low, so that high-frequency heating can hardly be effected efficiently. On the other hand, if the appliance is so arranged that no standing wave exists in the vertical direction of the heating chamber, it follows that an object of heating is placed perpendicular to the electric field, so that efficient high-frequency heating can be effected. Moreover, since flanges having a width of about 30-50 mm are attached to the periphery of the front opening in the heating chamber to provide a microwave energy leakage preventing means, the external size of the heating appliance will not increase even if some additional functional structure is provided at the upper or lower wall surface of the heating chamber. In the embodiment of the invention, the high-frequency heating source is mounted on the upper wall surface and the turntable mechanism is mounted beneath the lower wall surface.

In order to efficiently supply high-frequency power to an object of heating, it is important first to efficiently transmit the output power from the high-frequency heating source to the heating chamber, this objective being achieved by resonating the heating chamber, and secondly to decrease the loss of the high-frequency power transmitted to the heating chamber caused by other than the object of heating, this objective being achieved by increasing the Q value of the heating chamber (which is proportional to the ratio of the energy stored in the heating chamber to the loss) during resonance at no load.

Now, let a be a heating chamber dimension having m standing waves, b be a heating chamber dimension having n standing waves, and c be a heating chamber dimension having a standing waves. Then, the no-load Q of the heating chamber producing $TE_{mns}$ mode is expressed by the following relation.

$$Q \propto \frac{\left(\frac{m}{a}\right)^2 + \left(\frac{n}{b}\right)^2}{\lambda_0^2 \left[\left(\frac{2}{a} + \frac{\epsilon_n}{b}\right)\left\{\left(\frac{m}{a}\right)^2 + \left(\frac{n}{b}\right)^2\right\}^2 + \left(\frac{s}{c}\right)^2 \left\{\left(\frac{\epsilon_n}{b} + \frac{2}{c}\right)\left(\frac{m}{a}\right) + 2\left(\frac{1}{a} + \frac{1}{c}\right)\left(\frac{n}{b}\right)^2\right\}\right]}$$

$$\epsilon_n = \begin{matrix} 1 & n=0 \\ 2 & n\neq 0 \end{matrix}, \lambda_0 = \frac{1}{\sqrt{\left(\frac{m}{2a}\right)^2 + \left(\frac{n}{2b}\right)^2 + \left(\frac{s}{2c}\right)^2}}$$

In the illustrated embodiment of the invention, the Q value at no load of the heating chamber producing $TE_{201}$ mode is inversely proportional to $(4/a^3 + 1/c^3)\lambda_0^2 + 2/b$, where $\lambda_0$ is the resonance frequency:

$$\lambda_o = \frac{1}{\sqrt{\left(\frac{2}{2a}\right)^2 + \left(\frac{1}{2c}\right)^2}}$$

As the amount of an object of heating is increased, the resonant frequency of the heating chamber, theoretically, shifts toward the low-value end; therefore, it is preferable that the resonant frequency at which the $TE_{201}$ mode takes place at no load in the heating chamber be in the neighborhood of the upper limit of frequency in the 915 MHz band allowed in the ISM frequency bands.

Assuming that this resonant frequency is constant and that the vertical dimension b of the heating chamber which is an independent variable with respect to said resonance frequency is constant, then the minimum value of $(4/a^3 + 1/c^3)\lambda_0^2$ is $a = c$. Further, since it is usual for the user to put an object of heating unconsciously substantially in the middle of the bottom surface of the heating chamber, it is preferable that the electric field be stronger in the middle region. Accordingly, it follows that the shorter the dimension having two standing waves, the closer to each other are the two standing waves. Thus, in a heating chamber wherein the balance of weight between the door and the body can be established with ease, the kind and size of objects of heating have less effect on the performance of the heating chamber, the output high-frequency power from the high-frequency heating source can be efficiently fed to the heating chamber, and the $TE_{201}$ mode is produced in the 915 MHz band, the invention realizes a means for reducing high-frequency power loss due to other than an object of heating and increasing the field strength in the middle region of the heating chamber so as to subject an object of heating efficiently to high-frequency heating, in such a manner that the resonant frequency of the heating chamber producing the $TE_{201}$ mode at no load is set in the neighborhood of the upper limit of the 915 MHz band (e.g., 926 4 MHz) and that the dimension of the heating chamber in the direction having two standing waves is equal to or shorter than the dimension of the heating chamber in the direction having a single standing wave.

INDUSTRIAL APPLICABILITY

As has been described so far, a high-frequency heating appliance according to the present invention uses no electron tube such as a magnetron and instead uses a solid-state high frequency generating section to constitute a high-frequency heating source, with the result that the appliance is small in size and a power savings is achieved. Further, the invention ingeniously prevents the balance of weight between the door and the body from being upset owing to the reduction of the weight of the high-frequency heating source.

We claim:

1. A high-frequency heating appliance comprising: a solid-state high-frequency wave generating heat source; upper and lower walls, widthwise extending side walls, and depthwise extending side walls, defining a heating chamber for receiving an object of heating; and a door pivotably mounted in one of said widthwise extending side walls for opening and closing said heating chamber; said solid-state high-frequency wave generating heat source having a predetermined resonant frequency in the 915 MHz band, said heating chamber having a volume such that only the $TE_{201}$ mode having no standing wave in the vertical direction in the heating chamber is produced in said band, said high-frequency heat source being located in one of said upper and lower walls, remote from the pivot support for said door with respect to substantially the middle of said one of said upper and lower walls.

2. A high-frequency heating appliance as in claim 1, wherein said heating chamber produces said $TE_{201}$ mode in the neighborhood of the upper limit of frequency in the 915 MHz band, and the dimension of the heating chamber in the direction having two standing waves is no greater than its dimension in the direction having a single standing wave.

* * * * *